US009489581B2

(12) United States Patent
Chen et al.

(10) Patent No.: US 9,489,581 B2
(45) Date of Patent: Nov. 8, 2016

(54) VEHICLE COUNTING AND EMISSION ESTIMATION

(71) Applicant: Nokia Corporation, Espoo (FI)

(72) Inventors: Xin Chen, Evanston, IL (US); Xinyu Huang, Cary, NC (US)

(73) Assignee: Nokia Technologies Oy, Espoo (FI)

( * ) Notice: Subject to any disclaimer, the term of this patent is extended or adjusted under 35 U.S.C. 154(b) by 61 days.

(21) Appl. No.: 14/456,404

(22) Filed: Aug. 11, 2014

(65) Prior Publication Data

US 2016/0042234 A1    Feb. 11, 2016

(51) Int. Cl.
*G06K 9/00* (2006.01)
*G06T 7/00* (2006.01)
*G06T 7/40* (2006.01)

(52) U.S. Cl.
CPC ....... *G06K 9/00785* (2013.01); *G06K 9/00476* (2013.01); *G06T 7/40* (2013.01); *G06T 2207/30236* (2013.01); *G06T 2207/30242* (2013.01)

(58) Field of Classification Search
None
See application file for complete search history.

(56) References Cited

U.S. PATENT DOCUMENTS

2005/0267657 A1* 12/2005 Devdhar ............ G06K 9/00208
701/33.4
2010/0322476 A1* 12/2010 Kanhere ............... G06T 7/0065
382/103
2014/0277917 A1* 9/2014 Banet ..................... G07C 5/00
701/31.5

FOREIGN PATENT DOCUMENTS

CN        103310444        9/2013

OTHER PUBLICATIONS

Palmgren et al, "Actual car fleet emissions estimated from urban air quality measurements and street pollution models", 1999, The Science of the Total Environment 235, pp. 101-109.*
Hsieh et al., Automatic Traffic Surveillance System for Vehicle Tracking and Classification, Jun. 2006, IEEE Explore, Digital Library.
Ide et al., Monitoring Entire-City Traffic Using Low-Resolution Web Cameras, Accessed Jun. 4, 2014, IBM Research, Tokyo.
McGaughey et al., Analysis of Motor Vehicle Emissions in a Houston Tunnel During the Texas Air Quality Study 2000, 2004, Atmospheric Environment.
Nishidha, Traffic Analysis Using Discrete Wavelet Transform and Bayesian Regression, Accessed Jun. 4, 2014, University of Calicut.

* cited by examiner

*Primary Examiner* — David F Dunphy
(74) *Attorney, Agent, or Firm* — Lempia Summerfield Katz LLC

(57) ABSTRACT

A computing device, for example, receives image data of vehicles on a path captured by a camera. The image is analyzed using a low level feature extraction on the image data. The computing device estimates exhaust levels produced by the vehicles based on the low level feature extraction or based on vehicle classifications and quantities determined from the low level feature extraction.

21 Claims, 15 Drawing Sheets

| TRAFFIC LEVEL | TRAFFIC SPEED | EMISSION FACTOR |
|---|---|---|
| 1 | 60 mph | 0.1 |
| 2 | 40 mph | 0.3 |
| 3 | 20 mph | 0.5 |
| 4 | 10 mph | 0.7 |
| 5 | 5 mph | 0.9 |

FIG. 10A

| FUNCTIONAL CLASS | TRAFFIC COUNT | EMISSION FACTOR |
|---|---|---|
| 1 | <50 veh/min | 0.1 |
| 1 | 51-100 veh/min | 0.4 |
| 1 | 100+ veh/min | 0.6 |
| 2 | <50 veh/min | 0.2 |
| 2 | 50+ veh/min | 0.8 |
| 3 | <50 veh/min | 0.3 |
| 3 | 50+ veh/min | 1.0 |

FIG. 10B

| TRAFFIC SPEED | STRATEGY |
|---|---|
| 1 | Fourth |
| 2 | Fourth |
| 3 | Third |
| 4 | Second |
| 5 | First |

FIG. 11A

| FUNCTIONAL CLASS | TRAFFIC SPEED | STRATEGY |
|---|---|---|
| Arterial | High | Fourth |
| Arterial | Medium | Second |
| Arterial | Low | Second |
| Collector | High | Fourth |
| Collector | Low | Second |
| Local | High | Fourth |
| Local | Low | Second |

FIG. 11B

VEHICLE COUNTING AND EMISSION ESTIMATION

FIELD

The following disclosure relates to the vehicle counting and/or exhaust emissions estimating based on a camera view, or more particularly, vehicle counting and/or emissions estimating based on low level feature extraction from images of the camera view.

BACKGROUND

Traffic reporting is the study of movement of vehicles on the roads. Analytical techniques may manage and track traffic information and derive travel times, guide driving behavior and optimize road infrastructure for cities. Traffic Message Channel (TMC) and other traffic services deliver traffic information to customers. Traffic incidents and traffic flow are reported through broadcasts. Traffic delays may be caused by one or more of congestion, construction, accidents, special events (e.g., concerts, sporting events, festivals), weather conditions (e.g., rain, snow, tornado), and so on.

Surveillance cameras may be used to monitor traffic levels. However, the analysis of video is computationally intensive. Tracking individual vehicles across image frames requires significant resources and is often impossible for busy roads. In addition, many surveillance cameras have low frame rates, which contribute to the difficulty of determining traffic conditions. The problem is further compounded because in high traffic situations, vehicles in the video images tend to overlap. While traffic speed estimations may be made, accurate vehicle counts cannot be obtained from video with overlapped vehicles. Some applications may require accurate vehicle counts to provide reliable data to the user.

SUMMARY

In one aspect, a computing device receives image data of vehicles on a path captured by a camera. The image is analyzed using a low level feature extraction on the image data. The computing device estimates exhaust levels produced by the vehicles based on the low level feature extraction or based on vehicle classifications and quantities determined from the low level feature extraction.

BRIEF DESCRIPTION OF THE DRAWINGS

Exemplary embodiments of the present invention are described herein with reference to the following drawings.

FIGS. 10A and 10B illustrate example relationships between traffic levels and emission.

FIGS. 11A and 11B illustrate example relationships between traffic levels and emission estimation strategies.

DETAILED DESCRIPTION

A traffic camera is a video camera that is positioned to record or transmit video data of a road and the vehicles traveling on the road. Traffic cameras may be useful to give a snapshot of the current traffic conditions of the road or to monitor for traffic conditions such as congestion, construction, or accidents. Typically, a user views the video stream and makes a conclusion on traffic conditions based on the visible traffic. However, no traffic data can be easily extracted from the video stream images.

One or more of the following embodiments provide algorithms for classifying vehicles and counting vehicles from video images. Low level features may be used to analyze the video images for vehicle classification and vehicle counting. From the vehicle classification and vehicle count, exhaust emissions may be estimated. In one example, the exhaust emissions are calculated based on vehicle count. In another example, the exhaust emissions are calculated based on vehicle counts for different classifications of vehicles. In another example, the exhaust emissions are calculated directly from the low level features of the video images.

The exhaust emissions may be associated with a route or a section of a path. A mapping application may display estimated exhaust levels on various paths or routes. A navigation application may determine possible routes between a destination and an origin and select a preferred route based on potential emission exposure along the route. A map may display exhaust levels in different areas to aid users in choosing a place to visit, a neighborhood for a home, or a school.

Figure 1:
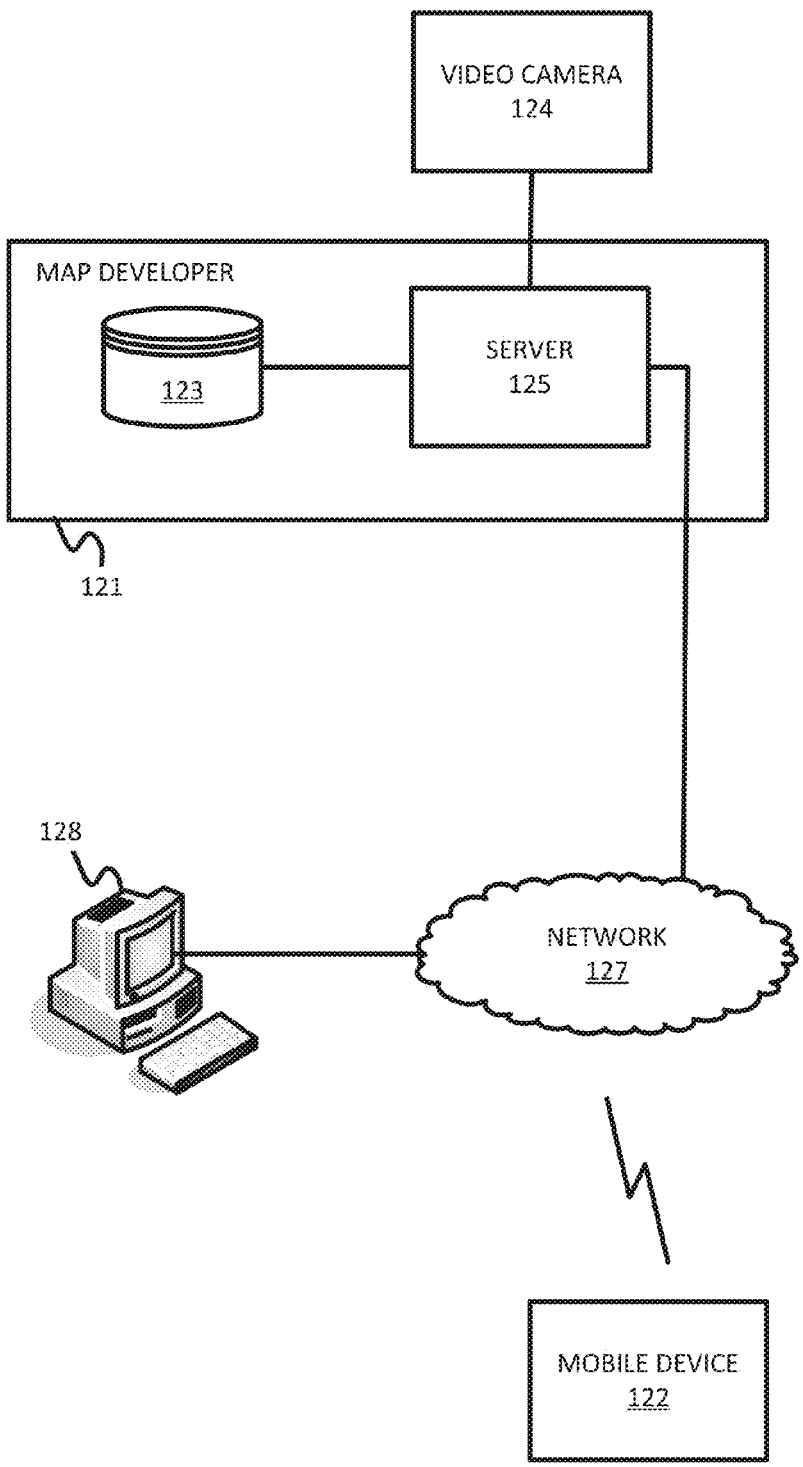
FIG. 1 illustrates an example system for vehicle counting and emission estimation.

FIG. 1 illustrates an example system for vehicle counting and emission estimation. The system 120 includes a developer system 121, one or more mobile devices 122, a workstation 128, and a network 127. The system 120 may receive a video stream including traffic from video camera 124. Additional, different, or fewer components may be provided. For example, many mobile devices 122 and/or workstations 128 connect with the network 127. The developer system 121 includes a server 125 and a database 123. The developer system 121 may include computer systems and networks of a system operator.

Figure 2A:
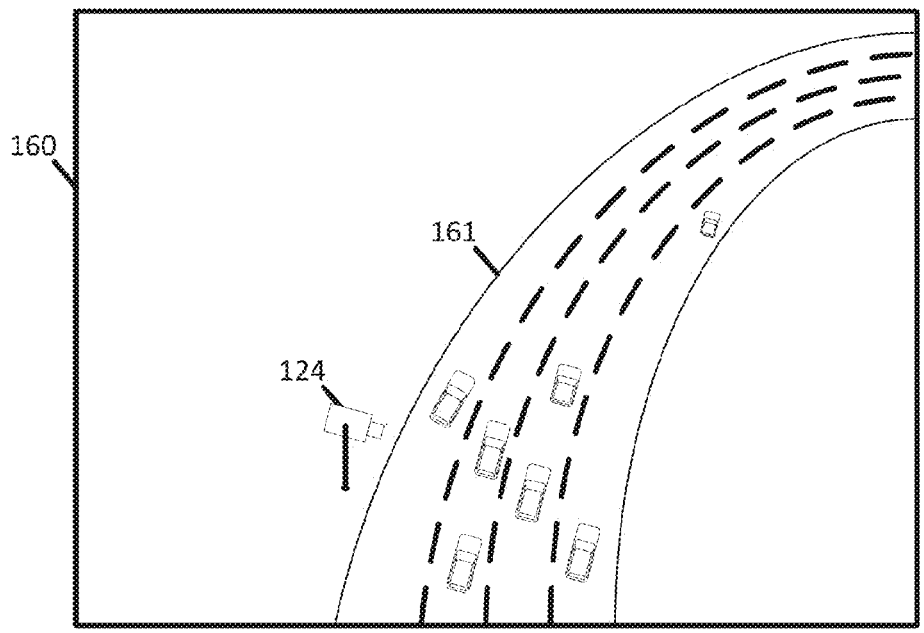
FIG. 2A illustrates an example path and video surveillance camera.

FIG. 2A illustrates an example path 161 and video surveillance camera 124. The video camera 124 collects images depicting vehicles traveling along the path 161. The path 161 may be a street, highway, or a path of any functional class. A frame rate of the vehicle camera 124 defines how many images are captured per unit time. The frame rate may be a low frame rate, which may be defined as below a predetermined value or less than the rate at which the human eye interprets the images as fluid motion (e.g., 5, 10, 20, or 25 frames per second). The low frame rate may be comparable to time lapse photography, for example in the range of 1 frame per second to 1 frame per minute. The frame rate may be adjustable and user configurable. The video camera 124 may store the images of the vehicles and/or send the images to the server 125.

The server 125 may perform an initial image processing to separate the vehicles from the rest of the image. One computer vision technique for separating the vehicle images (foreground image) from the rest of the image (background image) is background subtraction. Normally, only the moving portions of an image of a road include vehicles. The static portions depict the road itself, signs, guardrails and other objects. The static portions are removed from the image. The remaining portion of vehicle images may be referred to as vehicle image segments. When vehicles are spaced apart in the image, each vehicle is an individual vehicle image segment. When vehicles overlap in the image, multiple vehicles may form a vehicle image segment.

Overlapping vehicles may be in different lanes such that a line perpendicular to the direction of travel intersects multiple vehicles. In another example, overlapping vehicles may be in different lanes such that a line in the direction of the view of the camera 124 intersects multiple vehicles. Two adjacent vehicles in the same lane may also overlap when they both overlap the same vehicle in another lane. Overlapping vehicles may be defined as a continuous span of pixels relating to vehicles across more than one vehicle. Overlapping vehicles means that at least a portion of one of the vehicles is occluded by another vehicle.

Figure 2B:
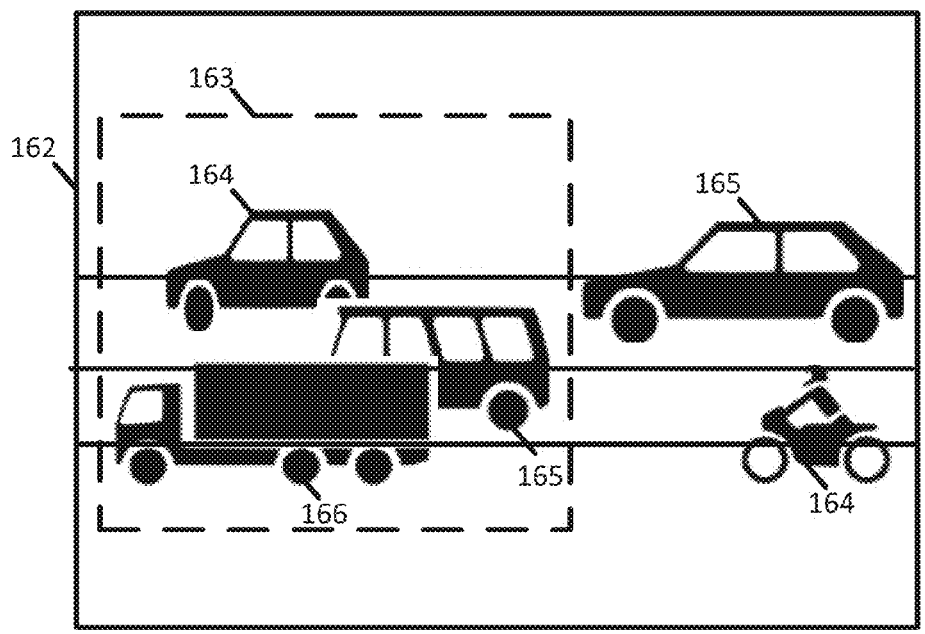
FIG. 2B illustrates an example of overlapped vehicles.

FIG. 2B illustrates an example video frame 162 from camera 124 including overlapped vehicles. The video frame 162 includes small sized vehicles 164, including a motorcycle and a small car, medium sized vehicles 165, including a large car and a van, and large sized vehicles 166, including a truck. The vehicles may be considered small, medium, and large based on type or based on the actual area in the video frame 162 taken up by the vehicle. One example scheme for vehicle classifications may include small size designations for motorcycles, economy vehicles, and compact vehicles, medium size designations for standard vehicles, full size vehicles, minivans, and small trucks, and large size designations for large trucks and sport utility vehicles.

FIG. 2B further illustrates a vehicle image segment 163 including multiple vehicles. The vehicle image segment 163 includes one small sized vehicle 164, one medium sized vehicle 165, and one large sized vehicle 166. The other vehicles (the motorcycle and large vehicle on the right side of FIG. 2A) in the video frame 162 are included in individual vehicle image segments.

The server 125 extracts low level features from the vehicle image segments. In one example, low level features include may be less computationally intensive measurements in the image as compared to full edge detection or feature transforms such as scale invariant feature transform (SIFT). Low level features may include dimensional low level features and textural low level features. Dimensional low level features may include one or more of a dimension of a foreground image segment or a dimension of an object in the foreground image segment. Textural low level features may include a texture coarseness for the foreground image segment. Coarseness is a general measure in the changes in pixel characteristics. Pixel characteristics may include color, brightness, hue, intensity, or another image property. Vehicles are normally a solid color or texture. When the background has a lot of textures or colors, a vehicle may be easily identified from a section of the image with a solid color or texture.

Examples of low level features may include the area of a vehicle image segment, a length of the vehicle image segment in the direction of the road, a width of vehicle image segment, a perimeter or circumference of the vehicle image segment, and the horizontal edge length of the vehicle image segment. The area of a vehicle image segment may be the number of pixels that make up the vehicle image segment or in square length units (e.g., $ft^2$, $m^2$). The length of the vehicle image segment in the direction of the road or the width of vehicle image segment may be described in pixels on length units (e.g., inches, meters, or feet). A perimeter or circumference of the vehicle image segment may also be measured in pixels or length. The circumference may be the precise perimeter along the edge of the vehicle segment, or the circumference may be estimated by fitting the nearest circle or oval to the vehicle image segment.

The server 125 may assemble the low level features extracted from the image into a feature vector. The feature vector includes a sequence of numerical values that represent the low level features. The feature vector may have any length. The feature vectors may include X and Y positions in the video frame 162 that are associated with low level features. For example, the feature vector may include a value that indicates coordinate positions of the vertices of a vehicle image segment. An example feature vector may be [X1 position, Y1 position; X2 position, Y2 position; X3 position, Y3 position; X4 position, Y4 position]. Another example feature vector may be [area of the vehicle image segment; length of the image vehicle segment]. Another example feature vector may be [pixels in the vehicle image segment; pixel width of the vehicle image segment; X position; Y position].

In another example, the video frame 162 may be divided into a grid, and the feature vector may state whether or not each location in the grid includes foreground images (i.e., vehicles). The grid may include 25, 100, 400, 1600 or another number of grid locations.

The server 125 performs a regression analysis on the feature vectors. The regression analysis may involve comparing the feature vectors to one or more classification vectors. The regression analysis may be a Poisson regression or Gaussian regression for statistically modeling historic data and defining the classification vectors. The classification vectors may be generated by the server 125 or another device according to ground truth measurements or a set of training feature vectors.

In one example, the server 125 determines vehicle counts for different classifications of vehicles. The server 125 may calculate or estimate exhaust emissions for the vehicles in the image based on the vehicle counts. The server 125 may include a lookup table that associates counts of vehicles or counts of vehicles for specific sizes of the vehicles to exhaust emissions. Small vehicles may be associated with a small amount of emissions and large vehicles may be associated with a large amount of emissions. The server 125 may determine a predicted exhaust level for the road based on the exhaust emissions. The exhaust level may be sent via network 127 to the workstation 128 or the mobile device 122. In another example, the classification vectors may be directly associated with exhaust emissions levels. In other words, the server 125 compares the feature vectors to one or more classification vectors to identify exhaust levels without the intermediate step of classifying or counting the vehicles.

In one example, the camera 124 may be substituted with an optical distancing device such as a light detection and ranging (LIDAR) device. The optical distance data produced by the LIDAR device may be analyzed to determine vehicle segment point clouds. The point clouds include low level features (e.g., dimensions and areas) analyzed in feature vectors similarly to the images described above.

The mobile device 122 is a smart phone, a mobile phone, a personal digital assistant ("PDA"), a tablet computer, a notebook computer, a personal navigation device ("PND"), a portable navigation device, and/or any other known or later developed portable or mobile computing device. The mobile device 122 includes one or more detectors or sensors as a positioning system built or embedded into or within the interior of the mobile device 122. The mobile device 122 receives location data for geographic position from the positioning system.

The optional workstation 128 is a general purpose computer including programming specialized for the following embodiments. For example, the workstation 128 may receive user inputs for activating lane level designations. The workstation 128 may receive user inputs for manually defining the speed ranges for the color, shading, or alphanumeric labels for traffic designations of the path segment.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components. The computing resources may be divided between the server 125 and the mobile device 122. In some embodiments, the server 125 performs a majority of the processing. In other embodiments, the mobile device 122 or the workstation 128 performs a majority of the processing. In another example, the processing is divided substantially evenly between the server 125 and the mobile device 122 or workstation 128.

The server 125, mobile device 122, or another computing device ("computing device") may be configured for a variety of strategies or techniques for estimating emissions. The strategy may be selected based on user configuration. That is, the computing device may access a strategy setting that defines the algorithm used for estimating emissions. In another example, the computing device may determine the strategy to be used based on current traffic conditions, time of day, or day of the week.

Figure 3A:
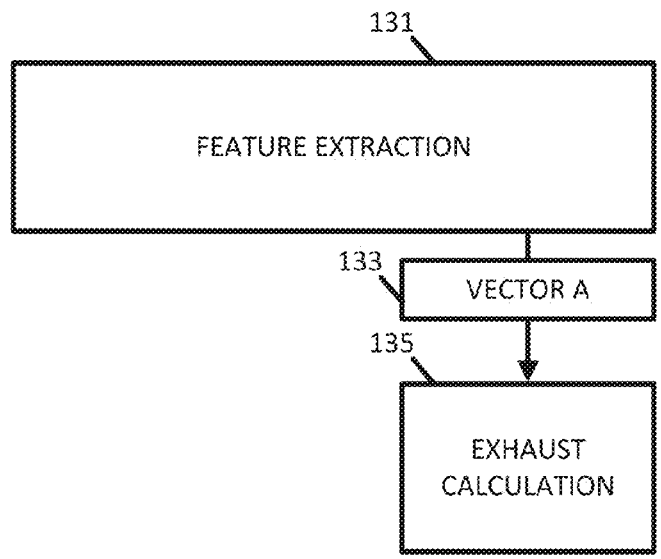
FIG. 3A illustrates a first strategy for emission estimation.

FIG. 3A illustrates a first strategy for emission estimation. The first strategy includes a feature extraction algorithm 131 that generates a feature vector 133 from the video frame. The feature vector 133 may describe one vehicle image segment or multiple (e.g., all) vehicle image segments in the video frame. The computing device may calculate a score from the feature vector 133. The score may be indicative of the estimated emissions of vehicles in the video frame. The score may be adjusted based on emission factors described below. For example, when the score is below a low threshold, the computing device generates a message indicative of low emissions, when the score is above the low threshold but less than a high threshold, the computing device generates a message indicative of medium emissions, and when the score is above the high threshold, the computing device generate a message indicative of high emissions. The message may identify the road segment or a geographic location depicted in the video frame. In this example, the score may be based on ground truth measurements that are associated with different exhaust levels. The ground truth measurements may be historical data for the attributes of the feature vectors at times when the exhaust levels are known. Thus, historical ground truth measurements for emissions may be correlated with ranges of low level features or scores based on low level features in a lookup table. The lookup table associates emission values directly from low level image features.

In another example, the computing device compares the feature vector 133 to one or more classification vectors. The classification vectors may have been generated during a learning algorithm. Example learning algorithms include neural networks, Bayesian networks, or fuzzy logic. In the learning algorithm, the computing device analyzes video frames with known emission levels and associates the emission levels with vehicle counts or the low level features. The computing device may generate a classification vector for low emissions, a classification vector for medium emissions, and a classification vector for high emissions. The computing device compare the new feature vector the classification vectors and may calculate a distance between the new feature vector and the classification vectors. The distance may be a geometric or algebraic distance based on the difference between values in the vectors. The feature vector is classified with the classification vector associated with the smallest distance.

Figure 3B:
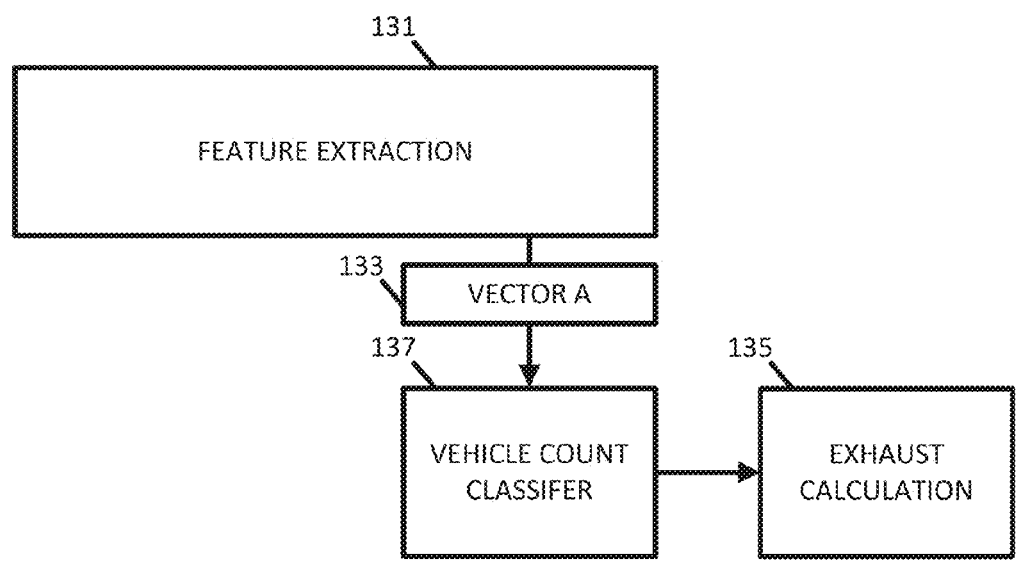
FIG. 3B illustrates a second strategy for emission estimation.

FIG. 3B illustrates a second strategy for emission estimation. The second strategy includes a feature extraction algorithm 131 that generates a feature vector 133 from the video frame. However, instead of proceeding directly to emission estimation as in the first strategy, the second strategy uses the feature vector 133 for determining a count of vehicles. The computing device may generate a score from the feature vector 133, which is compared to one or more thresholds. In one example, the score and the vehicle count may be the same number or proportionally related. The computing device may compare the feature vector 133 to one or more classification vectors for determining the vehicle count.

In this example, the score or the classifications vectors may be based on ground truth measurements that are associated with different vehicle counts. The ground truth measurements may be historical data for the attributes of the feature vectors at times when the vehicle counts are known. Thus, historical ground truth measurements for vehicle counts may be correlated with ranges of low level features or scores based on low level features in a lookup table. The lookup table may associate vehicle counts directly from low level image features.

The computing device may estimate vehicle emissions for the vehicles in the video frame based on the vehicle count. The computing device may include a lookup table in memory that associates vehicle count with emission levels. The lookup table may incorporate other factors such as historic traffic levels, recent weather patterns, time of day, day of the year, or geographic area. The computing device generates a message based on the emissions result from the lookup table. The message may identify the road segment or a geographic location depicted in the video frame.

Figure 4:
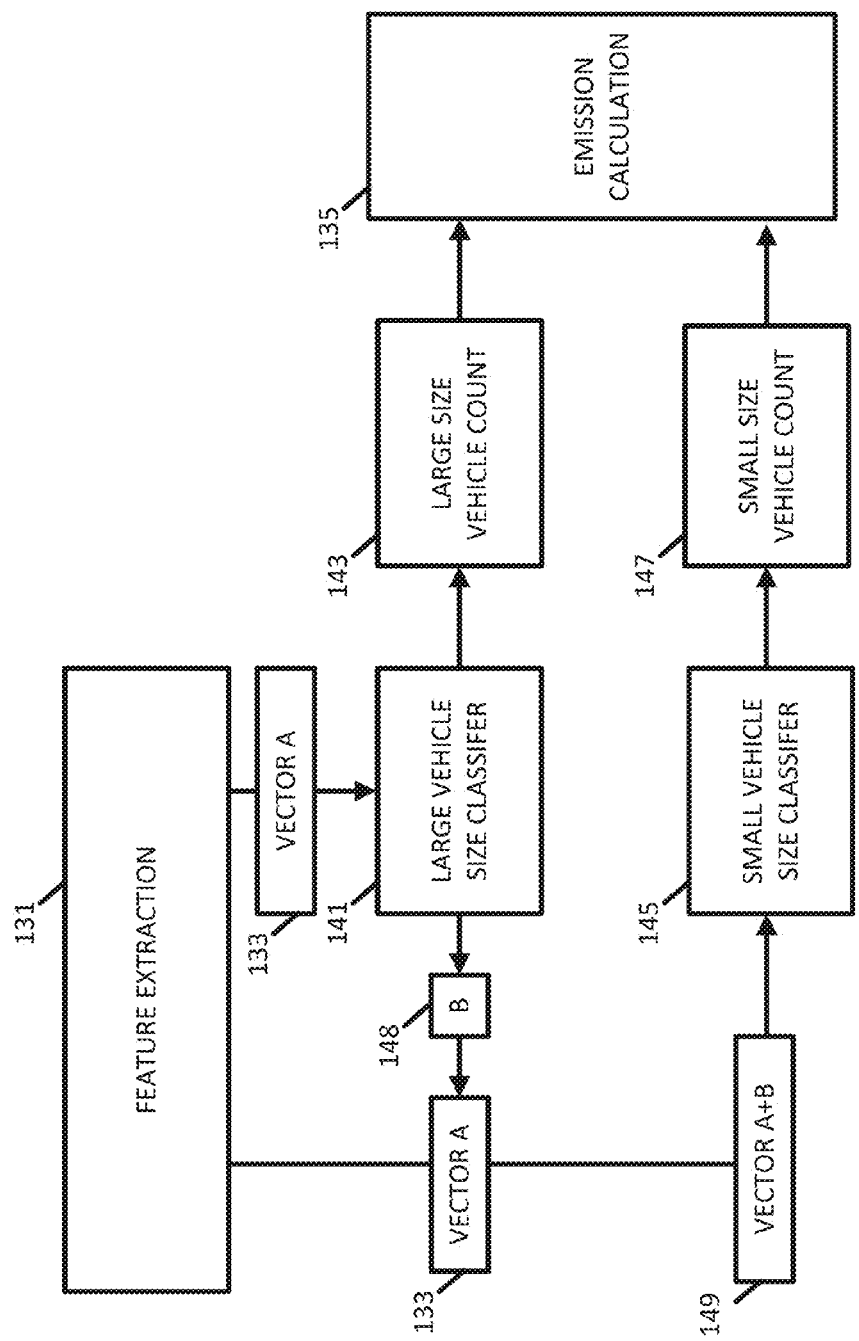
FIG. 4 illustrates a third strategy for emission estimation.

FIG. 4 illustrates a third strategy for emission estimation. The third strategy includes a feature extraction algorithm 131 that generates a feature vector 133 (vector A) from the video frame. The third strategy also includes a cascaded regression algorithm in which the vehicle count for one class of vehicles affects the count of another class of vehicles. First, large sized vehicles are identified. Next, the results of the large sized vehicle identification are used as an input for identifying small sized vehicles. The third strategy includes a large vehicle size classifier 141, a large size vehicle count 143, a small vehicle size classifier 145, a small size vehicle count 147, and an emission calculation 135. Additional, different, or fewer components may be included.

The feature extraction algorithm 131 generates low level features in one or more feature vectors 131 for the video frame. The feature vector 133 is analyzed by large vehicle size classifier 141 to determine the large size vehicle count 143 that describes how many large vehicles are included in the vehicle frame. The large vehicle size classifier 141 may compare the feature vector 133 to one or more classification vectors for large size vehicles. The large size vehicle count 143 is also included in one or more values 148 (B) concatenated with the feature vector 133 to form vector A+B 149. The vector A+B 149 is fed to the small vehicle size classifier 145. The small vehicle size classifier 145 may compare the vector A+B 149 to one or more classification vectors for small size vehicles to determine the small size vehicle count 147.

As shown by emission calculation algorithm 135, the exhaust emissions for vehicles in the video frame may be determined by the computing device based on the large size vehicle count 143 and the small size vehicle count 147. In one example, the computing device includes a lookup table that includes emission values for various quantities of large size vehicles and emission values for various quantities of small size vehicles. The exhaust emissions may be calculated by multiplying the large size vehicle count 143 by an emission factor and the small size vehicle count 147 by an emission factor.

In this example, the classifications vector for small size vehicles and/or the classification vector for large size vehicles may be based on ground truth measurements that are associated with different vehicle counts. The ground truth measurements may be historical data for the attributes of the feature vectors at times when counts for small vehicles and counts for large vehicles are known. Thus, historical ground truth measurements for vehicle counts may be correlated with ranges of low level features or scores based on low level features in a lookup table. The lookup table may associate vehicle counts directly from low level image features.

Figure 5:
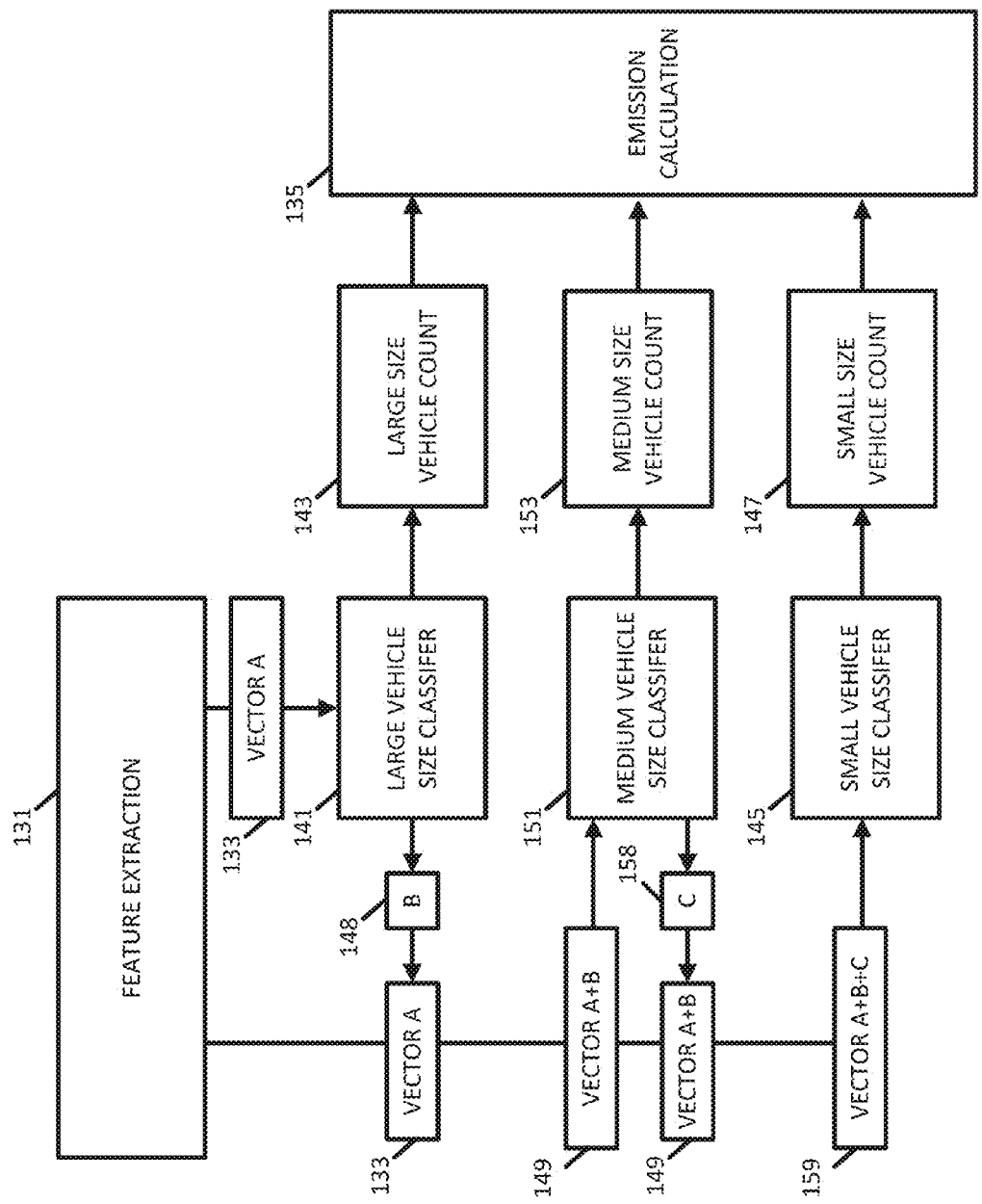
FIG. 5 illustrates a fourth strategy for emission estimation.

FIG. 5 illustrates a fourth strategy for emission estimation implemented by the computing device. The fourth strategy includes a feature extraction algorithm 131 that generates a feature vector 133 (vector A) from the video frame and a cascaded regression algorithm. In addition to, a large vehicle size classifier 141, a large size vehicle count 143, a small vehicle size classifier 145, a small size vehicle count 147, and an emission calculation 135, the fourth strategy includes a medium vehicle size classifier 151 and a medium size vehicle count 153. Additional, different, or fewer components may be included.

The computing device, as shown by large vehicle size classifier 141, is configured to identify a quantity for a first vehicle class (large size vehicle count 143) from the video frame based on the low level feature extraction. The large size vehicle count 143 may also be added to the feature vector 133. A value 148 (vector B) is concatenated to the feature vector 133 to form concatenated vector 149 (vector A+B).

The computing device, as shown by medium vehicle size classifier 151, is configured to identify a quantity for a second vehicle class (medium size vehicle count 153) from the video frame based on the concatenated vector 149. The medium size vehicle count 153 may also be added to the concatenated feature vector 149. A value 158 (vector C) is concatenated to the feature vector 149 to form concatenated vector 159 (vector A+B+C).

The computing device, as shown by small vehicle size classifier 145, is configured to identify a quantity for a third vehicle class (small size vehicle count 147) from the video frame based on the concatenated vector 159.

The computing device, as shown by emission calculation algorithm 135, is configured to calculate exhaust values for the large size vehicles, medium size vehicles, and small size vehicles based on the large size vehicle count 143, the medium size vehicle count 153, and small size vehicle count 147.

In this example, one or more of the classifications vector for small size vehicles, the classification vector for medium size vehicles, and the classification vector for large size vehicles may be based on ground truth measurements that are associated with different vehicle counts for the respective vehicle classifications. The ground truth measurements may be historical data for the attributes of the feature vectors at times when counts for small vehicles and counts for large vehicles are known. Thus, historical ground truth measurements for vehicle counts may be correlated with ranges of low level features or scores based on low level features in a lookup table. The lookup table may associate vehicle counts directly from low level image features.

The computing device may be configured to automatically select the first strategy, the second strategy, the third strategy, or the fourth strategy based on current traffic conditions, time of day, or day of the week. The computing device may receive traffic measurements for current traffic levels from TMC or another traffic service. The computing device may include predicted traffic levels based on the time of day and/or day of the week. For example, the cascaded regression of strategies three and four, in which vehicle counts from one vehicle class are concatenated to the feature vector for a subsequent vehicle class, is used for high traffic levels, and the direct feature classification of strategies one and two is used for low traffic levels.

The computing device may be configured to automatically select the first strategy, the second strategy, the third strategy, or the fourth strategy based on geographic locations or a particular path segment. The computing device may receive a geographic location. In the case of workstation 128, a user may enter an address for the geographic location, and in the case of mobile device 122, a user's location may be detected using global positioning service (GPS). For example, the cascaded regression of strategies three and four, in which vehicle counts from one vehicle class are concatenated to the feature vector for a subsequent vehicle class, is used for high traffic areas or urban areas, and the direct feature classification of strategies one and two is used for low traffic areas or rural areas.

Figure 6A:
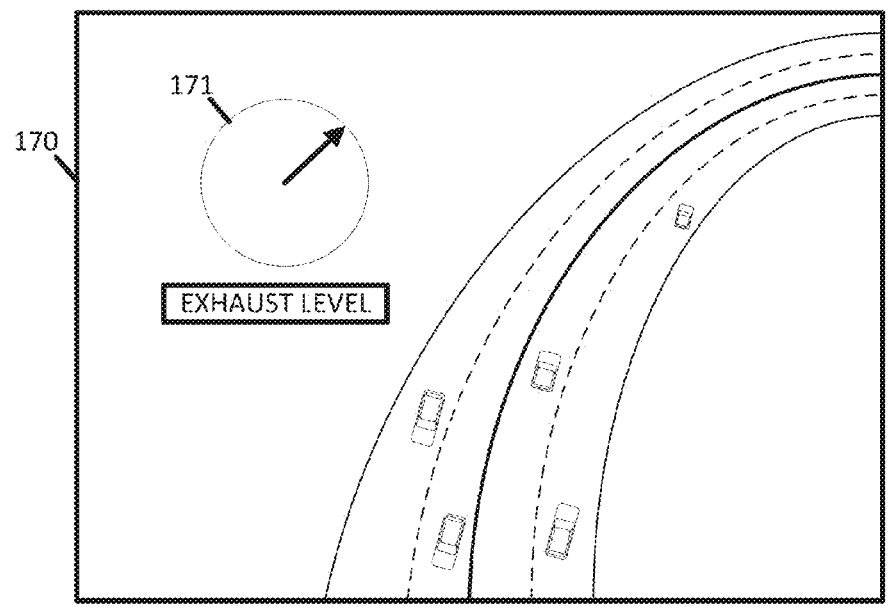
FIG. 6A illustrates traffic perspective view and an exhaust emission indicator.

FIG. 6A illustrates traffic perspective view 170 and an exhaust emission indicator 171. The computing device may analyze the video using one of the algorithms above to estimate exhaust emissions. Data indicative of the exhaust emissions is displayed in the exhaust emissions indicator 171. In one example, the exhaust emission indicator 171 includes alphanumeric characters (e.g., high emissions, medium emissions, or low emissions). In another example, the exhaust emission indicator 171 may include a radial indicator or needle that rotates to indicate the exhaust emissions. The traffic perspective view 170 may be the same video used for counting vehicles or estimating emissions.

Alternatively, one view is used for counting vehicles and/or estimating emissions and the exhaust emission indicator 171 is overlaid on another video.

Figure 6B:
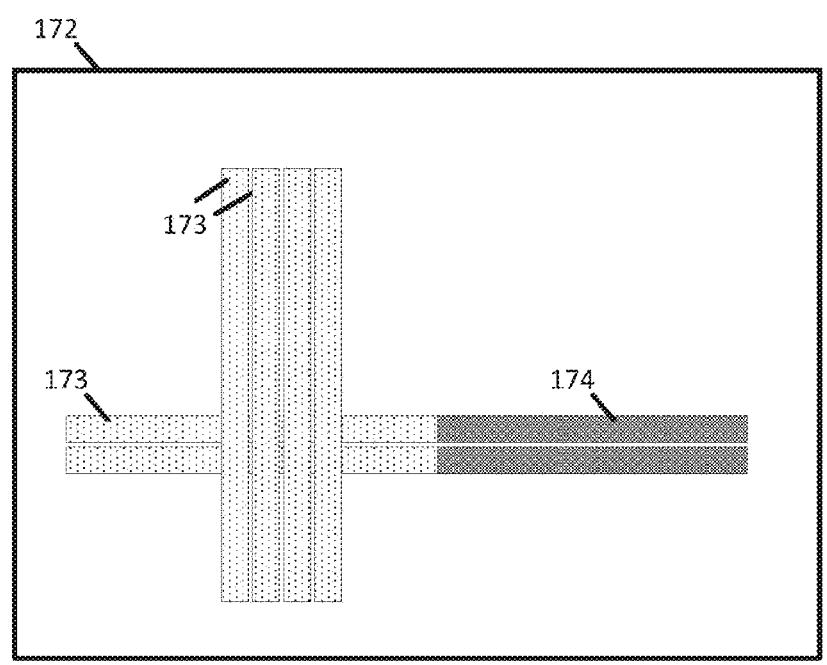
FIG. 6B illustrates a map view and an exhaust emission indicator.

FIG. 6B illustrates a map view 172 incorporated with an exhaust emission indicator 171. The exhaust emission indicator may be overlaid on the map. For example, the paths or road segments may be colored, shaded or highlighted to represent various emission estimations. The example in FIG. 6B includes a darkly shaded region 174 that indicates high emission levels and a lightly shaded region 173 that indicates low emission levels. The exhaust emission indicator 171 may be updated in real time (e.g., continuous) or substantially real time. Substantially real time refers to periodic updates occurring in response to changes in the exhaust emission indicator 171 or every predetermined time period. In other words, images collected by the video camera 124 may be immediately analyzed to determine real time emission conditions, which are displayed in map view 172 or any other the other views described herein. In addition, the map view 172 or any other the other views described herein may be presented on a mobile device 122, a workstation 128, or another device. In one example, the device selects a view from a website, a mapping application, or a routing application and in another example, the view is selected based on a current location of the device.

Figure 7A:
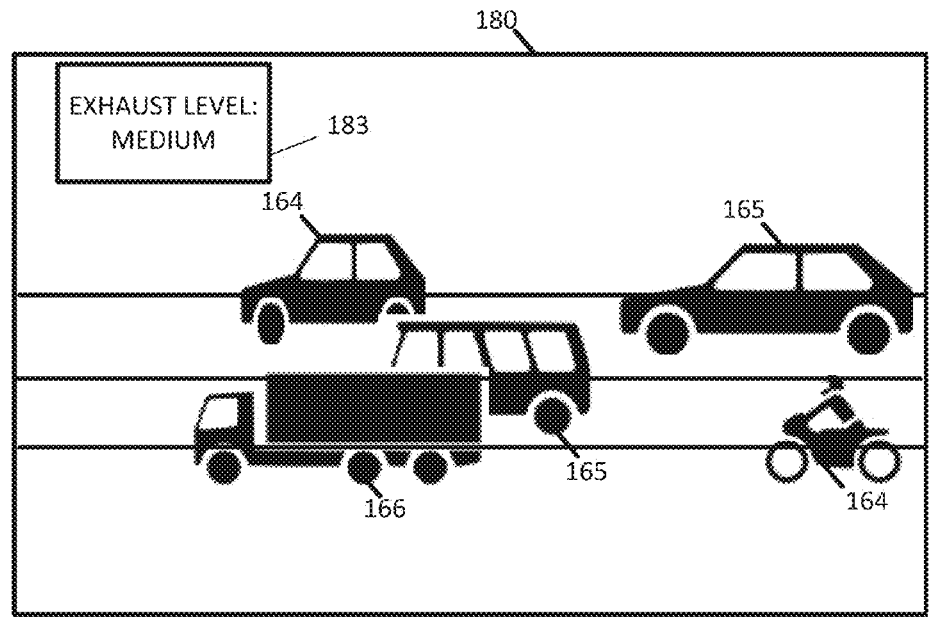
FIG. 7A illustrates street side view and an exhaust emission indicator.
Figure 7B:
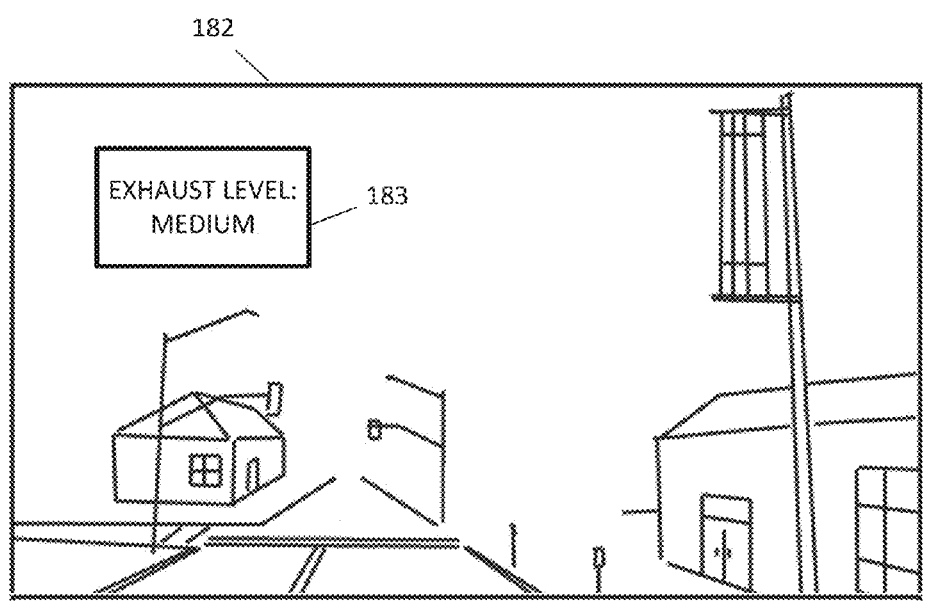
FIG. 7B illustrates walkthrough and an exhaust emission indicator.

FIG. 7A illustrates a street side view 180 and an exhaust emission indicator 183. The computing device is configured to separate the small sized vehicles 164, the medium sized vehicles 165, and the large sized vehicle 166 from the rest of the image and estimate emissions based on the quantity of vehicles. The exhaust emissions indicator 183 is displayed adjacent to the street side view 180. FIG. 7B illustrates a walkthrough view 182 in the exhaust emission indicator 183. The walkthrough view 182 is in the perspective of a driver driving along the path or a pedestrian walking along the path.

Figure 8:
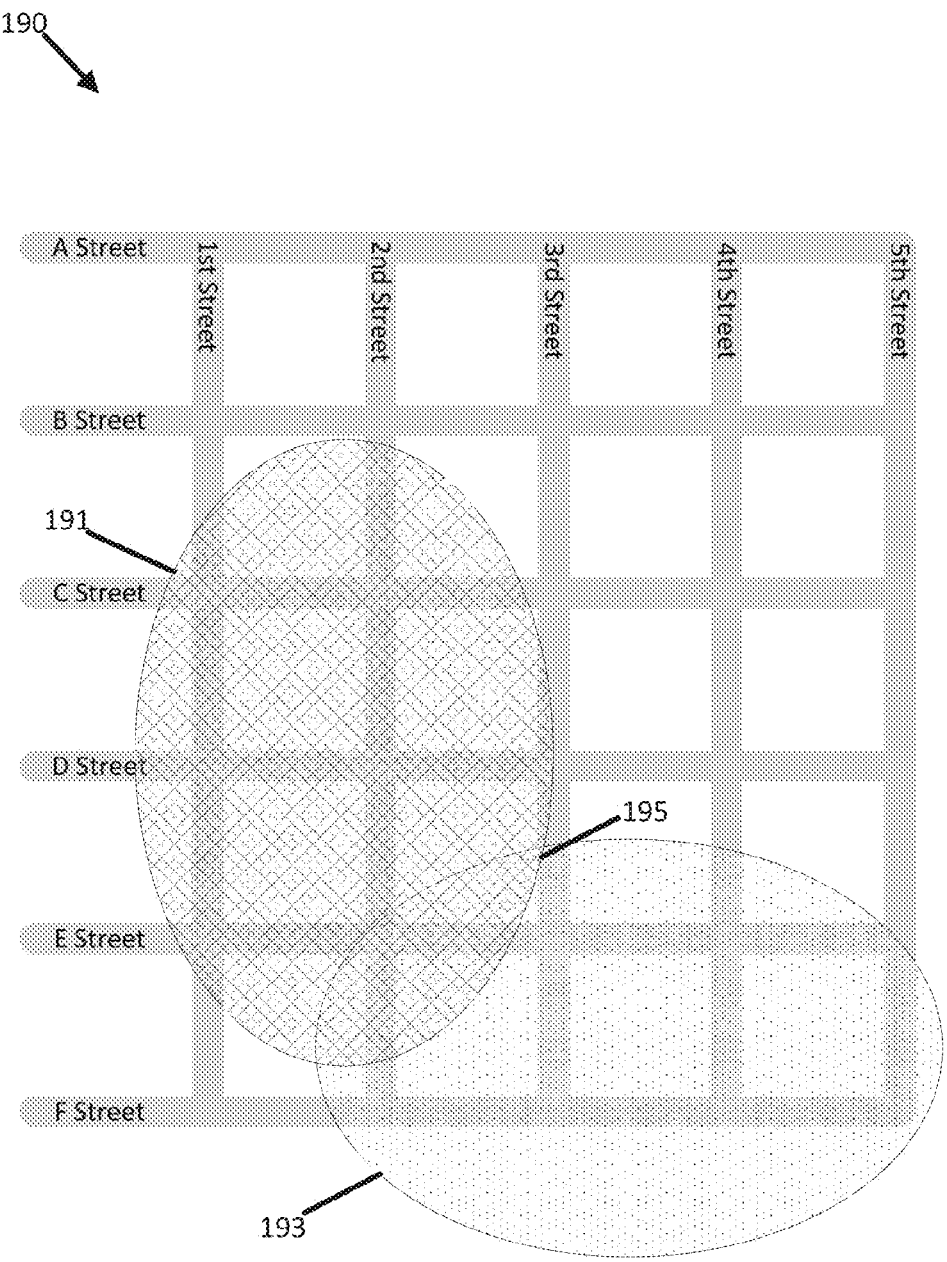
FIG. 8 illustrates another map view and graphical indicia.

FIG. 8 illustrates another map view 190 and graphical indicia for exhaust emissions. The graphical indicia include a first shaded region 191 and a second shaded region 193. The first shaded region 191 is shaded more heavily indicated higher estimate emission levels than in the second shaded region 193. Various shadings or colors may be used to represent different emission estimations. The first shaded region 191 may be based on traffic levels on a particular road (e.g., $2^{nd}$ street) or set of roads and the second shaded region 193 may be based on traffic levels for another particular road (e.g., F street) or set of roads. The two sets of roads may have one or more roads in common. The overlapping region 195 is an area that is likely to be affected by emissions from both areas. The size of the shaded regions may be calculated from the vehicle count and the classifications of vehicles.

Figure 9:
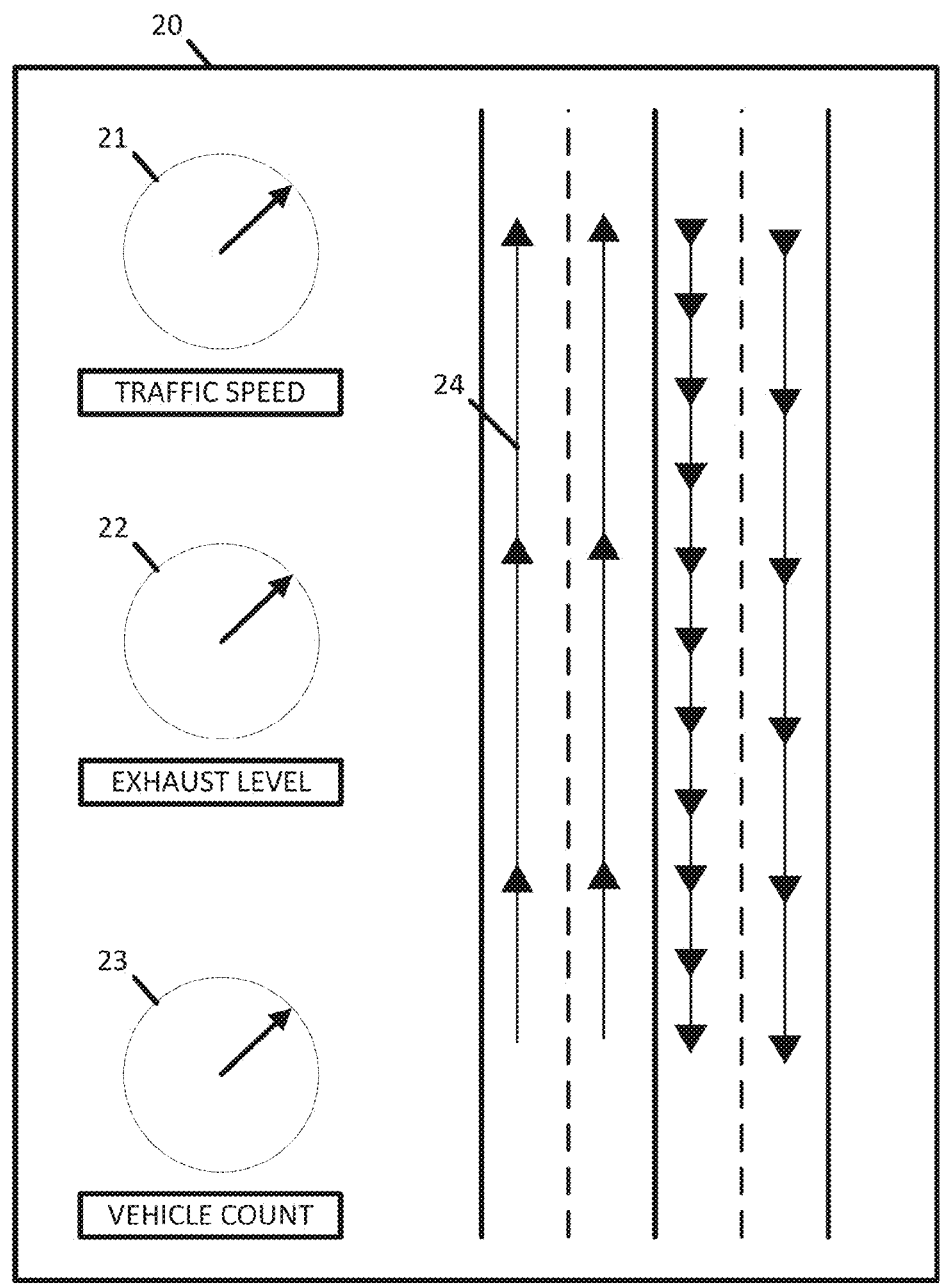
FIG. 9 illustrates an example combination traffic monitor interface.

FIG. 9 illustrates an example combination traffic monitor interface 20. The interface 20 includes multiple indicia derived from images from the traffic camera 124. The data from the vehicle count is displayed by a graphical traffic meter 23. The data from the exhaust estimation is displayed by exhaust level meter 22. The computing device may also compare vehicle image segments from one frame to the next to calculate the speed 21 of the traffic. The computing device may calculate the traffic speed 21 based on the density or flow of the vehicle image segments. The meters may include a textual output that describes the speed of traffic, exhaust levels, or vehicle count over a time period. The meters may include a graphical object such as a radial dial or a sliding bar that represents the speed of traffic or the volume of traffic. The traffic monitor interface 20 may include an image of the road and moving arrows 24 that represent traffic levels.

FIGS. 10A and 10B illustrate example tables for determining an emission factor. The emission factor may be used to normalize feature vectors for different traffic levels or scale the scores used to estimate exhaust levels. The emission factor may be a value from 0 to 1. Table 30 associates traffic levels or traffic speeds with emission factors. The traffic speed may be determined from successive frames of images collected by the traffic camera 124. The traffic speed may be received from a traffic service or downloaded from a website. The traffic level may be a numeric value assigned to a range of traffic speeds a different speed range (e.g., 5=0 to 5 mph, 4=6 to 10 mph, 3=11 to 20 mph, 2=21 to 40 mph, and 1=41 to 60 mph or above) or textual traffic level (e.g., 1=very light traffic, 2=light traffic, 3=medium traffic, 4=heavy traffic, and 5=very heavy traffic) which may vary in speed depending on the type of road. Heavier traffic and lower speeds tend to cause more exhaust, and higher emission factors, as reflected in table 30.

Table 40 associates the functional class of the road and the vehicle count to the emission factor. Higher vehicle counts are associated with higher emission factors. The functional class generally describes the size of the road. Emissions on larger roads may affect people less than the same amount of traffic on smaller roads.

One example of a simple system includes the functional classification maintained by the United States Federal Highway administration. The simple system includes arterial roads (e.g., class=1), collector roads (e.g., class=2), and local roads (e.g., class=3). The functional classifications of roads balance between accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

FIGS. 11A and 11B includes example tables for selection a regression strategy for emission estimation. As described above, a first strategy determines exhaust estimations directly from features extracted from the image, a second strategy determines exhaust emissions from a vehicle count derived from features extract from the image, a third strategy determines exhaust emissions from vehicle counts for two classes of vehicle, and a fourth strategy determines exhaust emissions from vehicle counts for three classes of vehicle. Different strategies may be optimal depending on traffic levels. Table 50 illustrates that in one example the computing device selects the fourth strategy for traffic levels 1 and 2, selects the third strategy for traffic level 3, selects the second strategy for traffic level 4, and selects the first strategy for traffic level 5. In one example, the computing device selects a regression strategy that includes a vehicle count (second, third, or fourth strategies) when traffic is a high level, and selects a regression strategy includes only the low level feature extraction (first strategy) when the traffic measurement is a low level.

Table 60 illustrates an example in which the computing device selects a strategy based on traffic speed and/or functional classification of the path. In the example shown, the computing device selects the fourth strategy for arterial roads that are experiencing high or medium traffic levels and for collector roads or local roads that are experiencing high traffic levels. The computer device selects the second strategy for all roads that are experiencing low traffic levels. Other techniques and strategies may be used.

In one example, the strategy is selected as a function of camera parameters for the video camera 124. Example camera parameters include the frame rate and the focal length. The third or fourth strategy may be selected for frame rates below a frame rate threshold, and the first or second strategy may be selected for frame rates above the frame rate threshold. The focal length relates to the amount of image data or vehicles in the frame. The third or fourth strategy may be selected for focal lengths above a focal length threshold, and the first or second strategy may be selected for focal lengths below the focal length threshold. More than one threshold may be used to delineate between any combination of the strategies.

In another example, the strategy is selected as a function of network parameters between the server 125 and the video camera 124. Example network parameters include bandwidth, transfer rate, and video resolution. The third or fourth strategy may be selected for network parameters below a network parameter threshold, and the first or second strategy may be selected for network parameters below the network parameter threshold. More than one threshold may be used to delineate between any combination of the strategies. In one example, the computing device may select a strategy based on a function of traffic speed, functional class, network parameters, and camera parameters.

Initially, the computing device receives image data of vehicles on a roadway. The computing device selects a regression strategy based on a traffic measurement for the path. The regression strategy includes a low level feature extraction. The traffic measurement may be a traffic speed or a numerical traffic level. The traffic measurement may be determined based on the image data or a series of images. The traffic measurement may be received from another device or traffic service. The computing device estimates exhaust levels for the vehicles based on the regression strategy.

Figure 12:
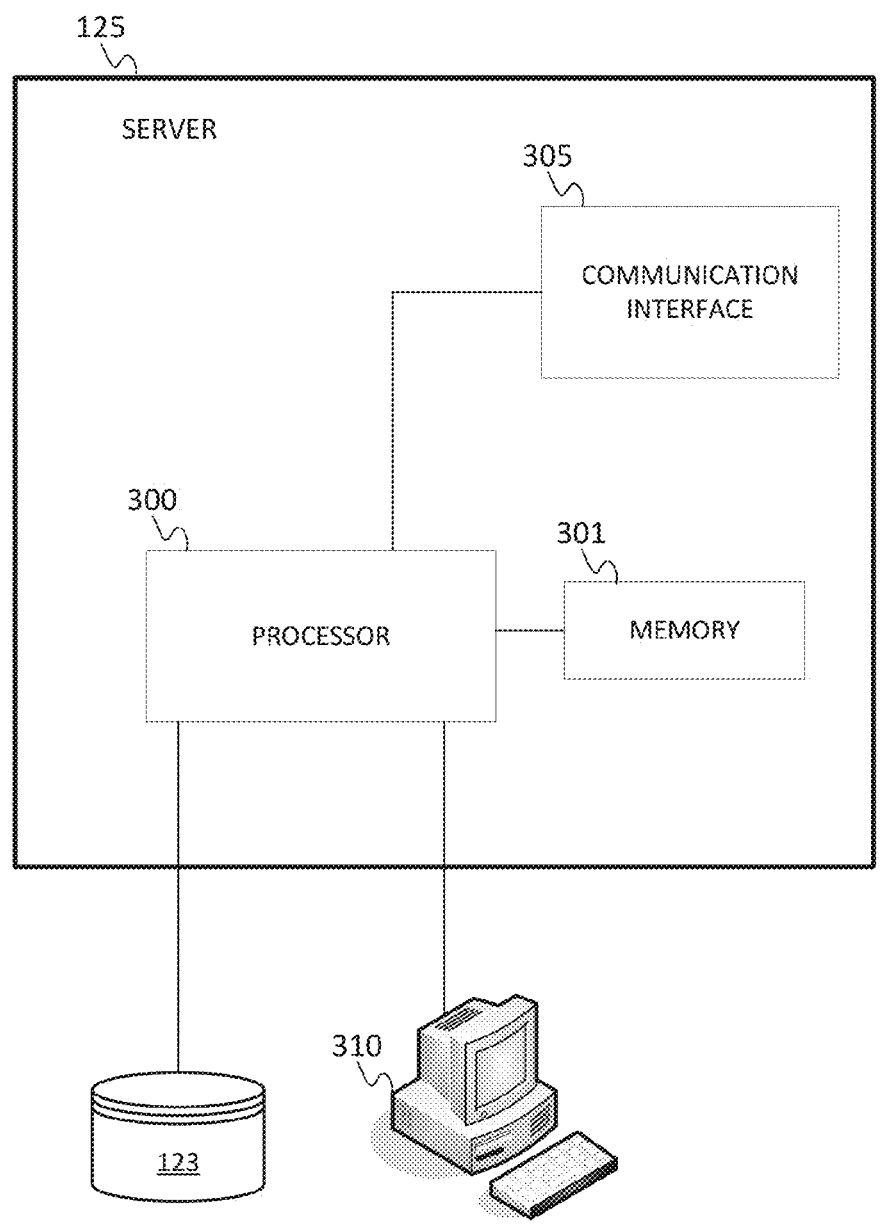
FIG. 12 illustrates an exemplary server of the system of FIG. 1.
Figure 13:
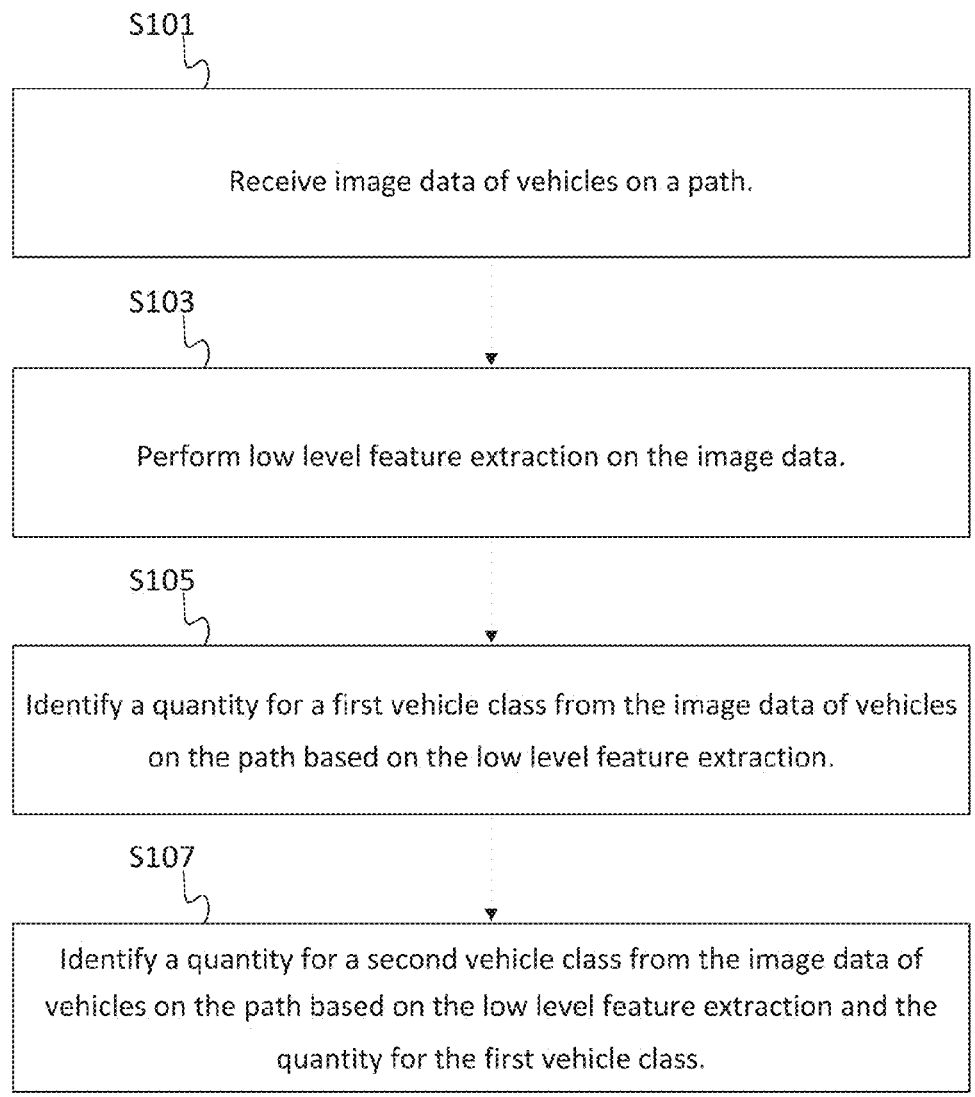
FIG. 13 illustrates example flowchart for the server of FIG. 12.

FIG. 12 illustrates an exemplary server 125 of the system of FIG. 1. The server 125 includes a processor 300, a communication interface 305, and a memory 301. The server 125 may be coupled to a database 123 and a workstation 310. The workstation 310 may be used as an input device for the server 125. In addition, the communication interface 305 is an input device for the server 125. The communication interface 305 receives data indicative of use inputs made via the workstation 128 or the mobile device 122. Additional, different, or fewer components may be included. FIG. 13 illustrates an example flowchart for lane level traffic distinctions from video. The acts of FIG. 13 may be performed by the server 125 or another device. Additional, different, or fewer acts may be provided.

At act S101, the processor 300 receives image data of vehicles on a path. The image data may be captured by a camera. In one example, the camera is incorporated into the mobile device 122 or another mobile device. In another example, the camera is mounted at a position along the path (e.g., on a utility pole or overpass).

At act S103, the processor 300 performs low level feature extraction on the image data. Other techniques such as object recognition, motion tracking, foreground detection, and background subtraction may be combined with the low level feature extraction. In background subtraction and foreground detection the background and foreground of images are separated. The foreground may be the part of the camera view nearer the observer or video or nearer to the point of view of the video camera, and the background may be the part of the camera view farther from the observer or farther from the point of view of the video camera.

Alternatively, the background and foreground may be defined according to the objects in the video. The background may include non-moving or static objects, and the foreground may include objects that are moving in the video. Movement of objects may be determined based on a comparison between a current frame and a reference frame. The reference frame (e.g., background frame or background model) may be manually set as an image including no moving objects. The reference frame may be set as the preceding frame (e.g., movement is determined from any consecutive pair of frames). The reference frame may be set as an average of multiple frames over time. The data representing the moving objects may be filter to remove pedestrians, bicycles, birds and other extraneous mobbing objects that should not be counted as vehicles.

Background subtraction may distinguish between the background and foreground of the camera view using frame differencing, a mean filter, and/or a gaussian average. Frame differencing includes a pixel-by-pixel comparison of intensity values between the reference frame and the current frame. The mean filter average a predetermined number of preceding frames and subtracts the result from the current frame. The gaussian average utilizes a probabilistic density function for a predetermined number of preceding frames. The probabilistic density function includes a mean and a standard deviation that are configurable to determine the degree of a Euclidean distance between pixels in the current frame and the reference frame.

At act S3.05, the processor 300 identifies a quantity for a first vehicle class from the image data of vehicles on the path based on the low level feature extraction or other computer vision technique. The class of vehicle may be a model type (e.g., motorcycle, car, passenger truck, sport utility vehicle, industrial truck, or van). The class of vehicle may be size (e.g., small or large).

The output of act S105, the quantity of the first vehicle class, is an input to act S107. At act S107, the processor 300 identifies a quantity for a second vehicle class from the image data of vehicles on the path based on the low level feature extraction and the quantity for the first vehicle class. Based on the quantity of the first vehicle class and the quantity of the second vehicle class, the processor 300 estimates exhaust levels. The quantity of vehicles of one or more classes and/or the estimated exhaust levels may be displayed on a mobile device 122, a workstation 128, or another device.

Figure 14:
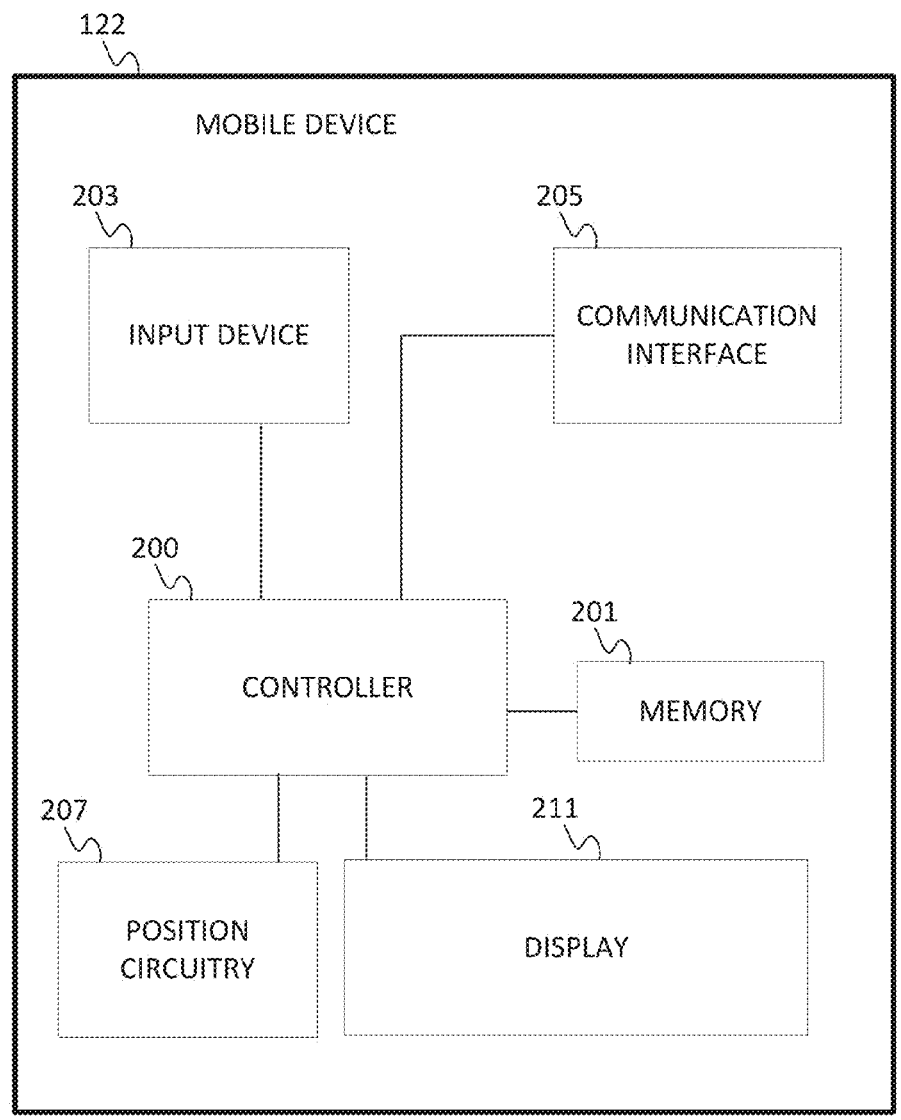
FIG. 14 illustrates an exemplary mobile device of the system of FIG. 1.
Figure 15:
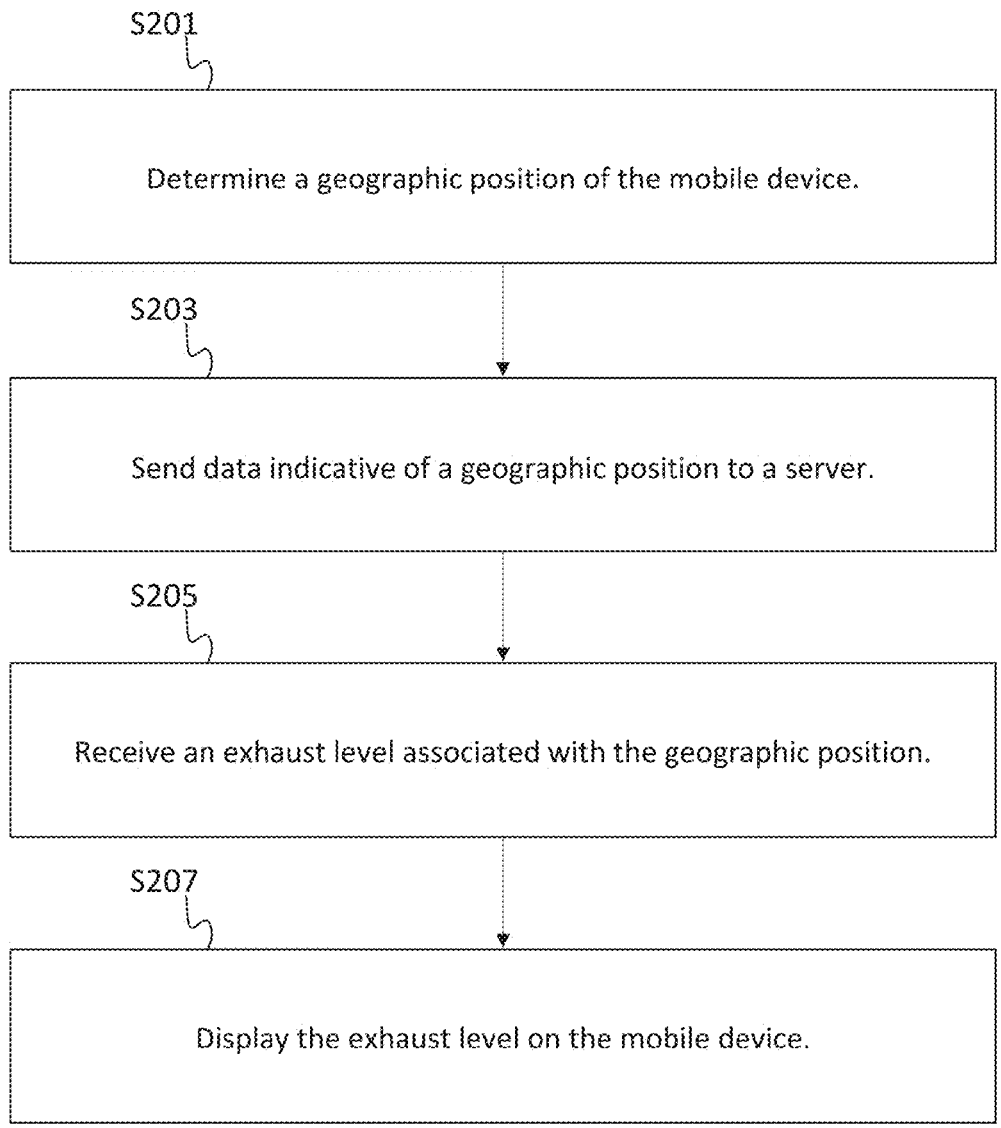
FIG. 15 illustrates an example flowchart for the mobile device of FIG. 14.

FIG. 14 illustrates an exemplary mobile device 122 of the system of FIG. 1. The mobile device 122 may be referred to as a navigation device. The mobile device 122 includes a controller 200, a memory 201, an input device 203, a communication interface 205, position circuitry 207, and a display 211. The workstation 128 may include at least a memory and processor and may be substituted for the mobile device in the following. FIG. 15 illustrates an example flowchart for lane level traffic determination. The acts of FIG. 15 may be performed by the mobile device 122 or another device. Additional, different, or fewer acts may be provided.

At act S201, the position circuitry 207 or the controller 200 determines a geographic position of the mobile device. The geographic position may be described by latitude and longitude values. The geographic position may be a street address or a value that identifies a road segment.

At act S203, the controller 200 or the communication interface 205 sends data indicative of the geographic position to server 125. The server 125 accesses an exhaust value in response to receiving the geographic position from the mobile device 122. The exhaust value may be generated by one or more of the regression strategies described above applied to traffic video data. At act S205, the controller 200 or the communication interface 205 receives the exhaust value from the server 125.

At act S207, the display 211 displays the exhaust value to the user. The exhaust value may be described graphically on a map. The exhaust value may be displayed in a warning to the user (e.g., high exhaust levels nearby). The exhaust value may be displayed in associated with a potential route.

The traffic levels and/or exhaust levels may also be used for autonomous driving. An autonomous vehicle is self-driving and may be referred to as a robot vehicle or an automated vehicle. The autonomous vehicle may include passengers but no driver is necessary. The mobile device 122 or another computer system in communication with the mobile device 122 may include instructions for routing the vehicle or operating the vehicle. An estimated travel time may be calculated based on the traffic values. The estimated travel times for possible routes and exhaust levels encountered on the routes may be displayed and a route may be chosen by a user based on the estimate travel time and the exhaust levels.

The computing system may generate driving commands for steering the vehicle, shifting gears, increasing and decreasing the throttle, and braking based on the traffic levels or exhaust levels. For example, when the exhaust level indicates high exhaust, the computing system may increase the spacing between vehicles because visibility is affected. In addition, cars may be routed away from high exhaust areas to reduce exhaust levels. In another example, when the traffic level indicates stop and go driving, the computing system of multiple autonomous vehicles may increase the spacing between vehicles to smooth out traffic congestion. The computing system may slow vehicles that are approaching congested areas.

The computing system may generate auxiliary commands for controlling the headlights, turn signals, windshield wipers, defrost, or other auxiliary functions not directly related to the movement of the vehicle. The autonomous vehicle may include sensors for identifying the surrounding and location of the car. The sensors may include GPS, light detection and ranging (LIDAR), radar, and cameras for computer vision. Proximity sensors may aid in parking the vehicle. The proximity sensors may detect the curb or adjacent vehicles. The autonomous vehicle may optically track and follow lane markings or guide markings on the road.

The database 123 may store or maintain geographic data such as, for example, road segment or link data records and node data records. The link data records are links or segments representing the roads, streets, or paths. The node data records are end points (e.g., intersections) corresponding to the respective links or segments of the road segment data records. The road link data records and the node data records may represent, for example, road networks used by vehicles, cars, and/or other entities. The road link data records may be associated with attributes of or about the roads such as, for example, geographic coordinates, street names, address ranges, speed limits, turn restrictions at intersections, and/or other navigation related attributes (e.g., one or more of the road segments is part of a highway or tollway, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The node data records may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases 123 may be maintained by one or more map developers (e.g., the first company and/or the second company). A map developer collects geographic data to generate and enhance the database. There are different ways used by the map developer to collect data. These ways include obtaining data from other sources such as municipalities or respective geographic authorities. In addition, the map developer may employ field personnel (e.g., the employees at the first company and/or the second company) to travel by vehicle along roads throughout the geographic region to observe features and/or record information about the features. Also, remote sensing such as, for example, aerial or satellite photography may be used.

The database 123 may be master geographic databases stored in a format that facilitates updating, maintenance, and development. For example, a master geographic database or data in the master geographic database is in an Oracle spatial format or other spatial format, such as for development or production purposes. The Oracle spatial format or development/production database may be compiled into a delivery format such as a geographic data file (GDF) format. The data in the production and/or delivery formats may be compiled or further compiled to form geographic database products or databases that may be used in end user navigation devices or systems.

For example, geographic data is compiled (such as into a physical storage format (PSF) format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

The input device 203 may be one or more buttons, keypad, keyboard, mouse, stylist pen, trackball, rocker switch, touch pad, voice recognition circuit, or other device or component for inputting data to the mobile device 122. The input device 203 and the display 211 may be combined as a touch screen, which may be capacitive or resistive. The display 211 may be a liquid crystal display (LCD) panel, light emitting diode (LED) screen, thin film transistor screen, or another type of display.

The positioning circuitry 207 is optional and may be excluded for the map-related functions. The positioning circuitry 207 may include GPS, Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 201 and/or memory 301 may be a volatile memory or a non-volatile memory. The memory 201 and/or memory 301 may include one or more of a read only memory (ROM), random access memory (RAM), a flash memory, an electronic erasable program read only memory (EEPROM), or other type of memory. The memory 201 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   receiving image data of vehicles on a path;
   performing, using a processor, low level feature extraction on the image data;
   selecting a regression strategy based on a traffic measurement for the path, wherein the regression strategy includes the low level feature extraction; and
   estimating exhaust levels produced by the vehicles based on the low level feature extraction,
   wherein inputs to the regression strategy includes only the low level feature extraction when the traffic measurement is a low level.

2. The method of claim 1, wherein the low level feature extraction determines a dimension of a foreground image segment, a dimension of an object in the foreground image segment, a texture coarseness for the foreground image segment, or a combination thereof.

3. The method of claim 1, wherein performing low level feature extraction on the image data comprises:
   identifying, from the low level feature extraction, a quantity for a first vehicle class from the image data of vehicles on the path; and
   identifying, from the low level feature extraction and the quantity for the first vehicle class, a quantity for a second vehicle class from the image data of vehicles on the path.

4. The method of claim 3, wherein the first vehicle class includes a first size of vehicles and second vehicle class includes a second size of vehicles.

5. The method of claim 3, wherein performing low level feature extraction on the image data further comprises:
   identifying, from the low level feature extraction and the quantity for the second vehicle class, a quantity for a third vehicle class from the image data of vehicles on the path.

6. The method of claim 3, wherein estimating exhaust levels produced by the vehicles based on the low level feature extraction comprising:
   determining exhaust levels based on the quantity for the first vehicle class and the quantity for the second vehicle class.

7. The method of claim 1, wherein estimating exhaust produced by the vehicles based on the low level feature extraction comprises:
   determining exhaust levels based on a vehicle count.

8. The method of claim 1, further comprising:
   overlaying graphical indicia for the exhaust levels of the path on geographic data.

9. The method of claim 1, wherein when the regression strategy includes a vehicle count when the traffic measurement is a high level.

10. A method comprising:
    receiving image data of vehicles on a path;
    performing, using a processor, low level feature extraction on the image data; and
    estimating exhaust levels produced by the vehicles based on the low level feature extraction,
    wherein performing low level feature extraction on the image data comprises:
    identifying, from the low level feature extraction, a quantity for a first vehicle class from the image data of vehicles on the path; and
    identifying, from the low level feature extraction and the quantity for the first vehicle class, a quantity for a second vehicle class from the image data of vehicles on the path; and
    concatenating data for the quantity for the first vehicle class to a feature vector for the low level feature extraction.

11. An apparatus comprising:
    at least one processor; and
    at least one memory including computer program code for one or more programs;
    the at least one memory and the computer program code configured to, with the at least one processor, cause the apparatus to at least perform:
    receiving image data of vehicles on a path;
    performing low level feature extraction on the image data;
    identifying, based on the low level feature extraction, a quantity for a first vehicle class from the image data of vehicles on the path;
    identifying, based on the low level feature extraction and the quantity for the first vehicle class, a quantity for a second vehicle class from the image data of vehicles on the path; and
    concatenating data for the first vehicle class and data for the second vehicle class to define a feature vector.

12. The apparatus of claim 11, wherein the at least one memory and the computer program code configured to, with the at least one processor, cause the apparatus to at least perform:
    estimating exhaust levels produced by the vehicles based on the quantity for the first vehicle class and the quantity for second vehicle class.

13. The apparatus of claim 12, wherein the at least one memory and the computer program code configured to, with the at least one processor, cause the apparatus to at least perform:

overlaying graphical indicia for the exhaust levels of the path on geographic data.

14. The apparatus of claim 11, wherein the low level feature extraction include a dimension of a foreground image segment, a dimension of an object in the foreground image segment, a texture coarseness for the foreground image segment, or a combination thereof.

15. The apparatus of claim 11, wherein the first vehicle class includes a first size of vehicles and second vehicle class includes a second size of vehicles.

16. The apparatus of claim 11, wherein the at least one memory and the computer program code configured to, with the at least one processor, cause the apparatus to at least perform:
identifying, based on the low level feature extraction and the quantity for the second vehicle class, a quantity for a third vehicle class from the image data of vehicles on the path.

17. The apparatus of claim 11, wherein the at least one memory and the computer program code configured to, with the at least one processor, cause the apparatus to at least perform:
selecting a regression strategy based on a traffic measurement for the path, wherein the regression strategy includes the low level feature extraction.

18. A non-transitory computer readable medium including instructions that when executed on a computer are operable to:
receiving image data of vehicles on a path;
selecting a regression strategy from a plurality of regression strategies based on a traffic measurement for the path, wherein the traffic measurement includes a traffic speed or a traffic level, wherein the regression strategy includes a low level feature extraction; and
estimating exhaust levels for the vehicles based on the regression strategy.

19. The non-transitory computer readable medium of claim 18, wherein the regression strategy includes a vehicle count when the traffic measurement is a high level.

20. The non-transitory computer readable medium of claim 18, wherein the vehicle count is determined based on:
identifying, based on the low level feature extraction, a quantity for a first vehicle class from the image data of vehicles on the path; and
identifying, based on the low level feature extraction and the quantity for the first vehicle class, a quantity for a second vehicle class from the image data of vehicles on the path.

21. A non-transitory computer readable medium including instructions that when executed on a computer are operable to:
receiving image data of vehicles on a path;
selecting a regression strategy based on a traffic measurement for the path, wherein the regression strategy includes a low level feature extraction; and
estimating exhaust levels for the vehicles based on the regression strategy, wherein inputs to the regression strategy include only the low level feature extraction when the traffic measurement is a low level.

* * * * *